United States Patent [19]
Wesner et al.

[11] Patent Number: 4,692,868
[45] Date of Patent: Sep. 8, 1987

[54] ADAPTIVE AUTOPILOT

[75] Inventors: Charles R. Wesner, Crozet; John F. Yancey, Charlottesville; Albert L. Coleman, Scottsville, all of Va.

[73] Assignee: Sperry Corporation, New York, N.Y.

[21] Appl. No.: 692,465

[22] Filed: Jan. 18, 1985

[51] Int. Cl.[4] .................. G06F 15/50; G05D 1/08
[52] U.S. Cl. ................................ 364/447; 364/457; 318/588
[58] Field of Search ............ 364/457, 447, 434, 424, 364/441; 318/588; 114/144 E

[56] References Cited
U.S. PATENT DOCUMENTS

| | | | |
|---|---|---|---|
| 4,055,135 | 10/1977 | Wesner | 114/144 E |
| 4,074,648 | 2/1978 | Reid et al. | 114/144 E |
| 4,223,624 | 2/1980 | Iyeta | 114/144 E |
| 4,342,274 | 8/1982 | Spurgin et al. | 318/588 X |
| 4,542,464 | 9/1985 | Kramer | 364/457 |

Primary Examiner—Errol A. Krass
Assistant Examiner—Thomas G. Black
Attorney, Agent, or Firm—H. P. Terry

[57] ABSTRACT

An adaptive autopilot for Marine Vessles which seeks to obtain minimum combined hull and rudder drag while maintaining heading control by providing optimum rudder activity through a series of iterative steps.

14 Claims, 2 Drawing Figures

ADAPTIVE AUTOPILOT

BACKGROUND OF THE INVENTION

1. Field of the Invention

The present invention relates to autopilot steering systems for marine vessels and more specifically to an autopilot that selects an optimum rudder activity position to minimize propulsion losses due to hull and rudder drag.

2. Description of the Prior Art

The operation efficiency of a marine vessel depends in large part on minimizing propulsion losses generated by resistance to forward motion of the vessel. The total vessel resistance of hull and rudder. Hull resistance is substantially a constant being function of hull design and loading. Therefore, in operation, only the rudder activity may be controlled to minimize overall resistance to forward motion.

For given operating conditions, resistance of a vessel to forward motion increases as yaw increases. Increasing the rudder activity in an effort to decrease yaw also increases resistance to forward motion. Therefore, optimum operating efficiency requires a balance between rudder activity and allowable yaw.

A prior autopilot seeking to accomplish the objective of balancing allowable yaw and rudder activity to yield a minimum resistance to forward motion is embodied in U.S. Pat. No. 4,074,648 issued Feb. 21, 1978 to Robert Reid et al and assigned to the assignor of the present invention. In Reid et al, the autopilot adjusts the sensitivity of the vessel's steering system to accommodate changes in speed, sea and wind conditions to provide a balance between yaw motion and rudder activity. However, in Reid et al, a detailed knowledge of the vessel's dynamic performance characteristics and extensive computer simulation is required to formulate the equations used to optimize the operating efficiency of any given vessel. Further, if the simulations do not match a vessel's actual performance, there are no corrections or calibration available to adjust the predicted performance to the actual performance so that operating efficiency of the vessel may be maximized.

In the present invention, a digital computer and its associated algorithm are adaptable to many types of vessels. No prior knowledge of a given vessel's characteristics are required and no computer simulation of a vessel's operating performance is required to practice the present invention.

SUMMARY OF THE INVENTION

An adaptive autopilot for marine vessels wherein the optimum rudder activity to obtain the least combined hull and rudder drag is determined by a series of iterative steps starting with the rudder position which yields the least yaw motion and continuing in steps until a rudder activity is obtained that yields the least resistance to forwrd motion of the vessel and still maintains heading control.

DESCRIPTION OF THE PREFERRED EMBODIMENT

Figure 1:
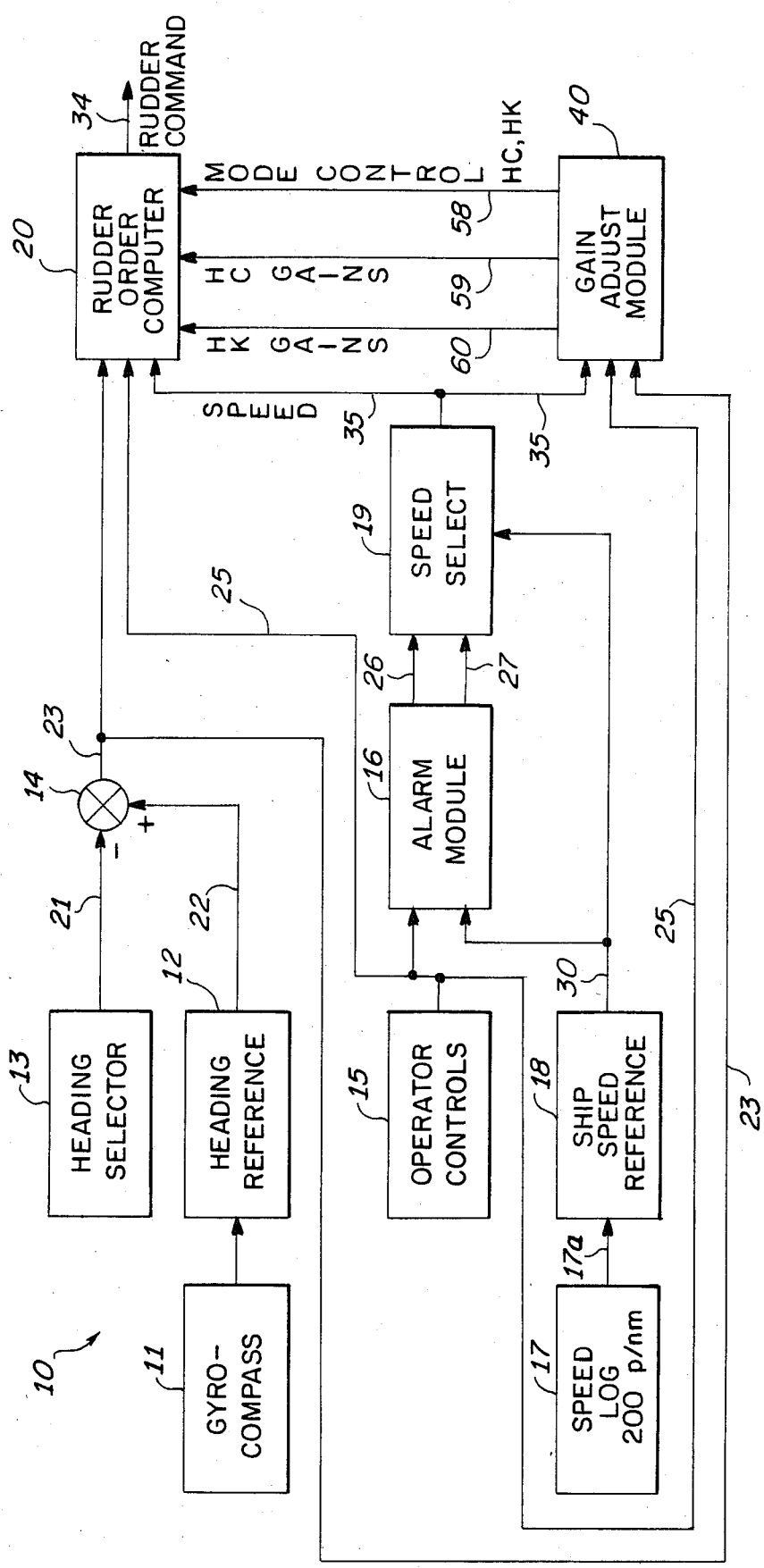
FIG. 1 is a block diagram of the Adaptive Steering Autopilot.
Figure 2:
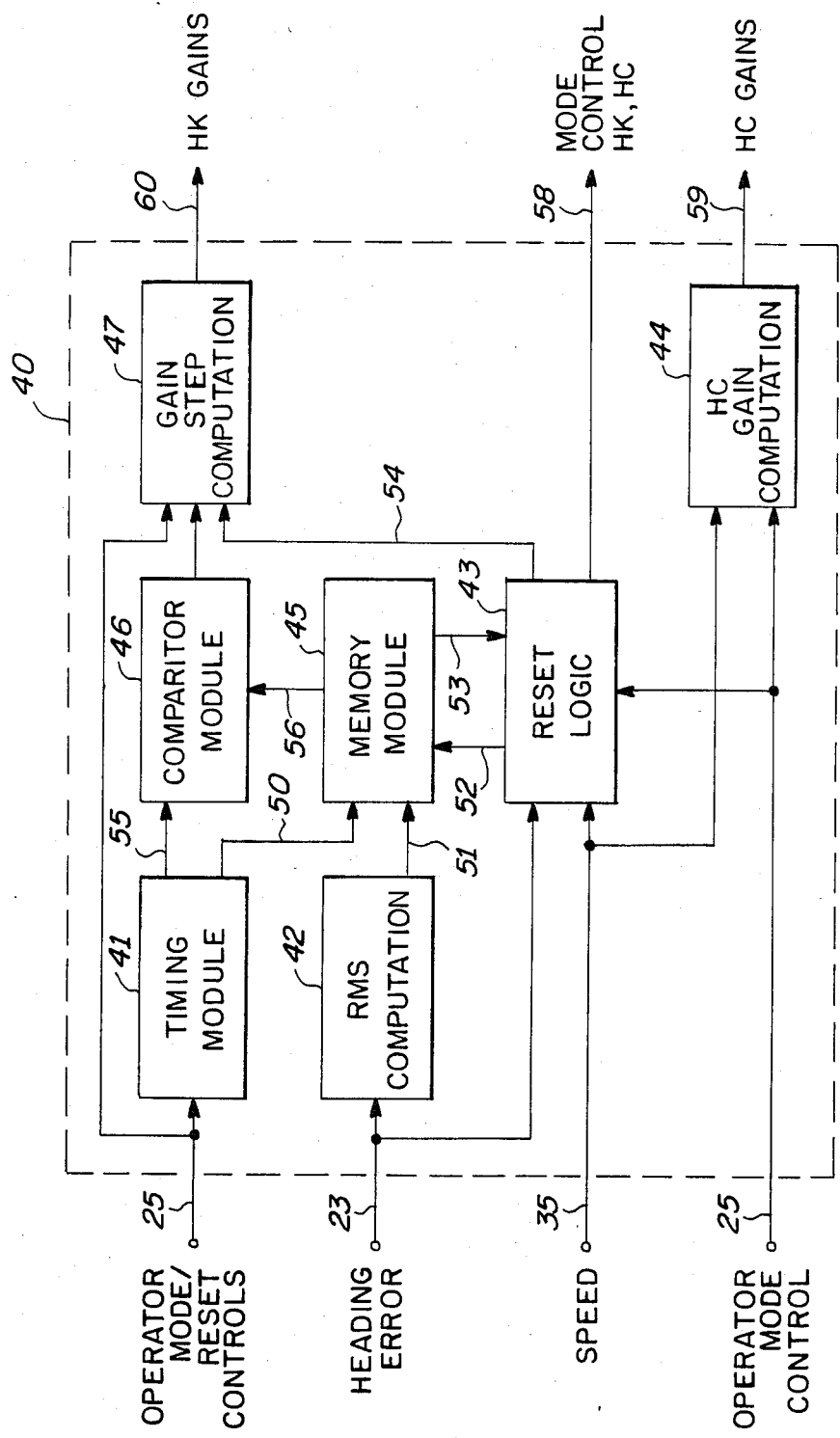
FIG. 2 is a block diagram of the Adaptive Steering Autopilot Gain Adjust Module.

To simplify the understanding of the present invention, it will be explained by using a generally analog format as shown in FIGS. 1 and 2. It will be understood that the present invention may be implemented by use of a programmable digital computer wherein the various analog inputs are converted to a digital format for processing and the digital output is converted to an analog signal to drive the rudder order apparatus.

Referring now to the adaptive autopilot 10 shown in FIG. 1, a heading selector 13 provides a heading selector signal 21 to summation device 14. A heading reference signal 22, derived from ship gyrocompass 11 and heading reference circuit 12, is also input to summation device 14. A heading error signal 23 representing the difference between input signals 21 and 22 is provided to rudder order computer 20 and gain adjust module 40. Mode control signal 25 are provided by operator control circuit 15 simultaneously to rudder order computer 20, alarm module 16 and gain adjust module 40. Ship speed log 17 provides pulse data 17a to ship's speed reference circuit 18 which in turn provide ship speed signal 30 simulataneously to alarm module 16 and speed select circuit 19. Alarm module 16 provides a default speed signal 26 and a speed log alarm signal 27 to speed select circuit 19. Speed select circuit 19 provides selected speed signal 35 to rudder order computer 20 and gain adjust module 40. Gain adjust module 40 provides mode control signals 58 for heading change (HC) and heading keeping (HK), heading change gain signal 59 and heading keeping gain signal 60 to rudder order computer 20, the output of which is rudder command 34.

Referring now to FIG. 2. Gain adjust module 40 accepts input of operator mode/reset control signal 25; heading error 23 and ships speed 35. Gain adjust module 40 calculates in according to the following description the heading keeping gain signal 60, heading change gain signal 59 and heading keeping and heading change mode control signal 58.

In operation, the present invention searches for the optimal rudder setting in three stages or modes. In mode 1, the root mean square (RMS) value of heading error 23 is computed in block 42 and output to memory module 45 via lead 51. Timing module 41 determines the pre-selected duration for mode 1 and outputs timing signals on leads 50 and 55. The RMS heading error signal 51 stored in memory module 45 during mode 1 is the reference RMS heading error signal. At the end of the initial measuring period, mode 1, timing module 41 initiates mode 2. In mode 2, a current RMS heading error signal 51 is computed from heading error signal 23 over a pre-selected time determined by timing module 41, and stored in memory module 45. Memory module 45 outputs both the reference RMS heading error signal and the current RMS heading error signal to comparitor module 46 on lead 56. If the current RMS heading error signal exceeds the reference RMS heading error signal by a pre-determined ratio, for example, 130%, then comparitor module 46 outputs a signal to gain step computation module 47 which increases the gain by one step, outputs the new heading keeping gain 60 and mode 3 to be described later is initiated. If the current RMS heading error signal does not exceed the reference heading error RMS signal by a predetermined amount, then the heading keeping gain 60 is reduced one step and a new comparison is made by comparitor module 46 for a duration determined by timing module 41. If the minimum heading keeping gain 60 is reached after a sequence of step reduction, the mode is changed to 3. If the value of the current RMS heading error signal is less than 0.7 degrees, the heading keeping gain 60 is reduced by one step by gain step computation module 47. If the value of the current RMS heading error signal exceeds 0.7 degrees and gain step was reduced on the previous time step by this 0.7 degree criteria, then the heading keeping gain 60 is increased by one step.

If the current peak heading error signal exceeds a predetermined value, for example, three times the previous RMS heading error signal or the current heating rate of change exceeds a predetermined value, for example three times the previous RMS heading rate signal and the previous RMS heading error signal is greater than a predetermined amount, for example, 1.0 degree, then the invention is reset to mode 1 and a new reference heading error signal is established.

Reset logic 43 accepts inputs of ship speed 35, operator mode control signal 25, heading error 23 and input from memory module 45 on lead 53. Reset logic 43 directs switching between modes 1, 2 and 3 by output to memory module 45 on lead 52, output to gain step computation module 47 on lead 54 and mode control output 58 to rudder order computer 20. Heading change computation module 44 accepts ship's speed signal 35 and operator mode control signal 25 and provides heading change gain signal 59.

The steady state or mode 3 will now be described. Current values of RMS heading error signal and heading error rate of change signal are monitored by gain adjust module 40. If the heading keeping gain 60 is not at a minimum and the current RMS heading error signal is less than, for example, one-half of the reference RMS heading error signal, then mode 1 is initiated. If the current RMS heading error signal is greater than, for example, one degree and the current RMS heading error signal is greater than, for example, 1.5 times the reference RMS heading error signal, then mode 1 is initiated.

The adaptive autopilot described herein is calibrated to establish allowable minimum and maximum rudder order signal gains under a plurality of ship load conditions at ship's design speed in substantially calm seas.

It will be appreciated that all the functions shown in FIGS. 1 and 2 may preferably be implemented by a digital computer program. The digital computer program listed subsequently in accordance with this invention is given in sufficient detail to enable those skilled in the art to carry it out. The digital computer program is written in assembly language and may be executed by a number of suitable digital processing systems, for example, the Intel 8085 microprocessor.

While the invention has been described in its preferred embodiments, it is to be understood that the words which have been used are words of description rather than limitation and that changes may be made within the purview of the appended clims without departing from the true scope and spirit of the invention in its broader aspects.

What is claimed is:

1. A method of heading keeping to minimize propulsion losses in a marine vessel utilizing an adaptive autopilot that has been calibrated to establish allowable minimum and maximum rudder order signal gains, comprising the steps of:

establishing a plurality of intermediate rudder order signal gain steps lying between said minimum and maximum rudder order signal gains, measuring a reference heading error signal over a selected time period, comparing said reference heading error signal with a current heading error signal, increasing or decreasing said rudder order signal gain in said intermediate steps to one of said steps in response to said comparison of said reference and current heading error signals for providing an optimum rudder order signal gain that minimizes propulsion losses, maintaining said optimum rudder order signal gain until changing conditions cause said comparison of reference and current heading error signals to exceed a predetermined limit thereby initiating selection of a new optimum rudder order signal gain for controlling the rudder of said marine vessel so as to provide said heading keeping.

2. A method of heading keeping according to claim 1 wherein said reference heading error signal is measured at said maximum rudder order signal gain.

3. A method of heading keeping according to claim 1 wherein calibrating of said adaptive autopilot includes calibration under a plurality of ship load conditions at ship's design speed in substantially calm seas.

4. A method of heading keeping according to claim 1 wherein a previously selected intermediate rudder order signal gain step is increased to a next higher step if said current heading error signal exceeds said reference heading error signal by approximately 30 percent.

5. A method of heading keeping according to claim 1 wherein a new reference heading error signal is measured when a current heading error peak signal exceeds a current heading error RMS signal by a factor of 3 and a current heading error RMS signal is greater than approximately 1 degree.

6. A method of heading keeping in according with claim 5 wherein a new reference heading error signal is measured when a current heding rate peak signal exceeds a current heading rate RMS signal by a factor of 3 and a current heading error RMS signal is greater than approximately 1 degree.

7. A method of heading keeping according to claim 1 wherein said reference and current heading error signals comprise RMS signals.

8. An adaptive autopilot for use in a marine vessel to provide heading keeping to minimize propulsion losses in said marine vessel, said autopilot having been calibrated to establish allowable minimum and maximum rudder order signal gains, said autopilot comprising:

means for establishing a plurality of intermediate rudder order signal gain steps lying between said minimum and maximum rudder order signal gains, means for measuring a reference heading error signal over a selected time period, means for comparing said reference heading error signal with a current heading error signal, means for increasing or decreasing said rudder order signal gain in said intermediate steps to one of said steps in response to said comparison of said reference and current heading error signals for providing an optimum rudder order signal gain that minimizes propulsion losses, and means for maintaining said optimum rudder order signal gain until changing conditions cause said comparison of reference and current heading error signals to exceed a predetermined limit thereby initiating selection of a new optimum rudder order signal gain for controlling the rudder of said marine vessel so as to provide said heading keeping.

9. An adaptive autopilot according to claim 8 wherein calibrating said adaptive autopilot includes calibration under a plurality of ship load conditions at ship's design speed.

10. An adaptive autopilot according to claim 8 wherein said reference heading error signal is measured with said rudder order signal gain at maximum.

11. An adaptive autopilot according to claim 8 wherein a current intermediate gain step is increased by 1 if said current heading error signal exceeds said reference heading error signal by approximately 30 percent.

12. An adaptive autopilot according to claim 8 wherein a new reference heding error signal is measured when a current heading error peak signal exceeds a current heading error RMS signal by a factor of 3 and a current heading error RMS signal is greater than approximately 1 degree.

13. An adaptive autopilot according with claim 12 wherein a new reference heading error signal is measured when a current heading rate peak signal exceeds a current heading rate RMS signal by a factor of 3 and a current heading error RMS signal is greater than approximately 1 degree.

14. An adaptive autopilot according to claim 8 wherein said reference and heading error signals comprise RMS signals.

* * * * *